United States Patent
Fan et al.

(10) Patent No.: US 8,031,594 B2
(45) Date of Patent: Oct. 4, 2011

(54) SYSTEM AND METHOD OF PROVIDING COMMUNICATIONS SERVICES

(75) Inventors: James Fan, San Ramon, CA (US);
Kevin Xiangkai Meng, San Ramon, CA (US); Chou Lan Pok, San Ramon, CA (US); Richard T. Kuo, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 980 days.

(21) Appl. No.: 11/541,468

(22) Filed: Sep. 29, 2006

(65) Prior Publication Data

US 2008/0080368 A1 Apr. 3, 2008

(51) Int. Cl.
*G01R 31/08* (2006.01)
*H04J 1/16* (2006.01)
*H04J 3/22* (2006.01)
*H04L 12/28* (2006.01)
*H04H 60/33* (2008.01)
*H04N 7/173* (2011.01)
*H04N 7/16* (2011.01)

(52) U.S. Cl. ............ 370/230; 370/395.21; 370/468; 725/9; 725/113; 725/141

(58) Field of Classification Search .......... 725/9, 113, 725/141; 370/230, 395, 468
See application file for complete search history.

(56) References Cited

U.S. PATENT DOCUMENTS

| | | | |
|---|---|---|---|
| 5,650,994 A * | 7/1997 | Daley | 370/259 |
| 7,391,780 B1 * | 6/2008 | Stone et al. | 370/395.41 |
| 2001/0044893 A1 * | 11/2001 | Skemer | 713/153 |
| 2002/0087656 A1 * | 7/2002 | Gargiulo et al. | 709/217 |
| 2004/0190699 A1 * | 9/2004 | Doherty et al. | 379/201.12 |
| 2004/0249927 A1 * | 12/2004 | Pezutti | 709/223 |
| 2005/0185656 A1 * | 8/2005 | Svensson et al. | 370/398 |
| 2005/0276246 A1 * | 12/2005 | Walker et al. | 370/329 |
| 2007/0005536 A1 * | 1/2007 | Caswell et al. | 706/20 |
| 2007/0107023 A1 * | 5/2007 | Versteeg et al. | 725/95 |
| 2007/0121525 A1 * | 5/2007 | Jenster | 370/252 |

* cited by examiner

*Primary Examiner* — Alpus H Hsu
*Assistant Examiner* — Jeremy Costin
(74) *Attorney, Agent, or Firm* — Toler Law Group (57) ABSTRACT

Disclosed are a system and method of providing communications services. In a particular embodiment, the method includes receiving data related to an attainable bandwidth of a communications loop coupled to a customer premise equipment (CPE) device, wherein at least one first communications service is provided by a private access network via the CPE device. The method also includes selecting at least one additional communications service to be offered, the at least one additional communications service selected based at least partially on the attainable bandwidth.

30 Claims, 6 Drawing Sheets

SYSTEM AND METHOD OF PROVIDING COMMUNICATIONS SERVICES

FIELD OF THE DISCLOSURE

The present disclosure relates generally to providing communications services.

BACKGROUND

Communication service providers can provide multiple communications services to users. Typically, the types of such services that can be provided over a network depend on the bandwidth allotted to each user. In some cases, the communications services provided to an individual user may be based on a theoretical bandwidth value that does not represent the actual bandwidth available to the user. Hence, there is a need for an improved system and method of providing communications services.

SUMMARY OF THE DISCLOSURE

A system to provide communications services is disclosed and includes a processor and a memory device accessible to the processor. In a particular embodiment, the memory device can include instructions to communicate with a communications service ordering system to receive a request for data related to at least one selected communications service. Further, the memory device can include instructions to retrieve an attainable bandwidth value associated with an identification of a user from a bandwidth management system and to compare the attainable bandwidth value with a theoretical bandwidth value. In addition, the memory device can include instructions to select the at least one selected communications service based at least partially on the attainable bandwidth value, when the attainable bandwidth value exceeds the theoretical bandwidth value.

In another particular embodiment, a method of providing communications services is disclosed and includes receiving data related to an attainable bandwidth of a communications loop coupled to a customer premise equipment (CPE) device, wherein at least one first communications service is provided by a private access network via the CPE device. The method also includes selecting at least one additional communications service to be offered, the at least one additional communications service selected based at least partially on the attainable bandwidth.

In a particular embodiment, a method of providing communications services is disclosed and includes receiving an order at an ordering system for a first communications service to be provided to a user. The method also includes receiving data related to at least one additional communications service to be offered to the user from a promotion system, wherein the promotion system selects the at least one additional communications service based at least partially on an attainable bandwidth of a communications loop coupled to a customer premise equipment (CPE) device.

In a particular embodiment, a method of providing communications services is disclosed and includes receiving data related to an offer of at least one communications service from a service provider system at a user communications device via a communications loop, wherein the service provider system selects the at least one communications service based at least partially on an attainable bandwidth of the communications loop.

In another particular embodiment, a computer-readable medium is disclosed and includes a group of instructions executable by a processor to communicate with an element management system to receive data related to an attainable bandwidth value related to a communications loop coupled to a customer premise equipment (CPE) device, wherein at least one first communications service is provided by a private access network via the CPE device. The computer-readable medium also includes instructions to offer at least one selected additional communications service, the at least one additional communications service selected based at least partially on the attainable bandwidth.

DETAILED DESCRIPTION OF THE DRAWINGS

Figure 1:
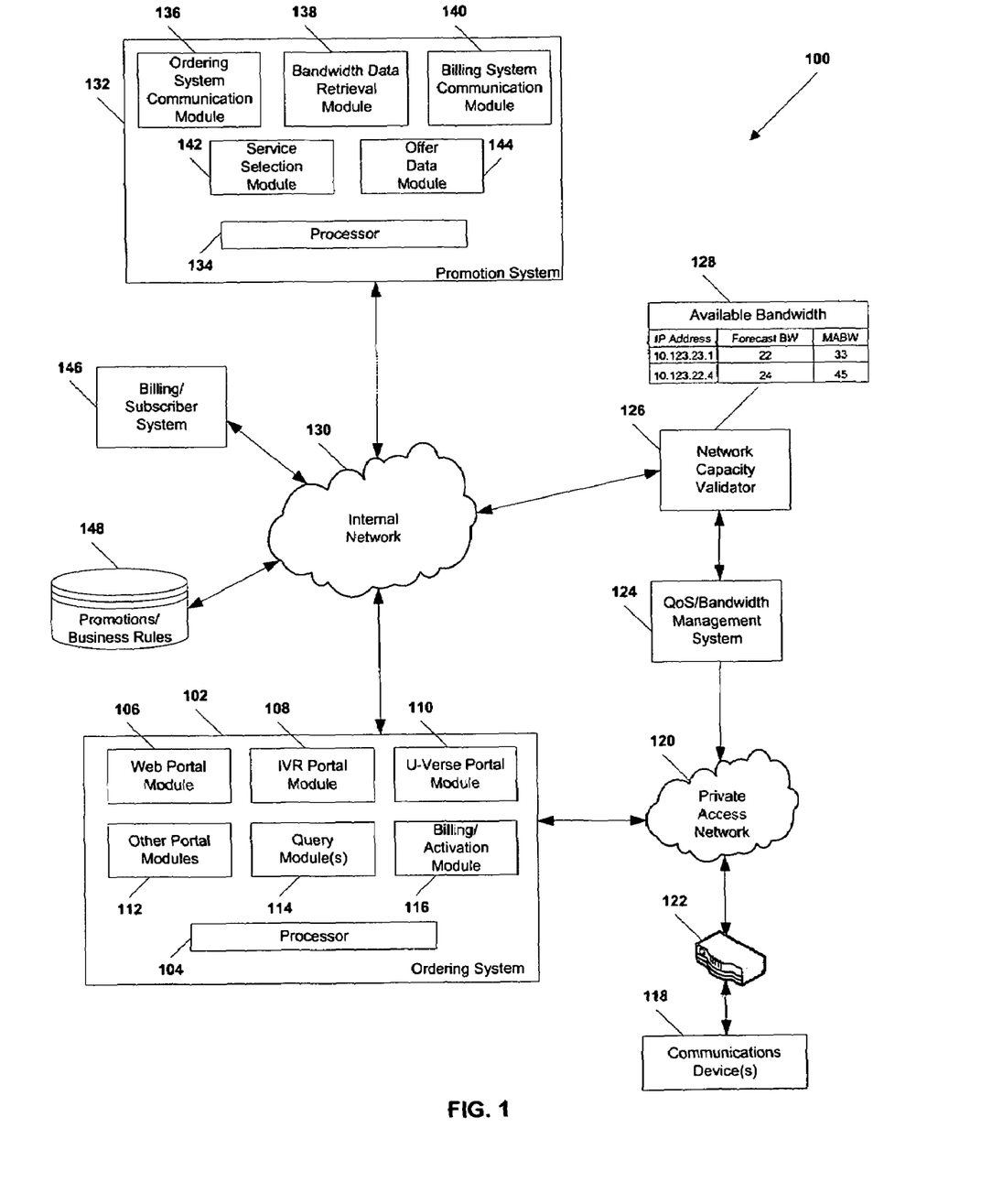
FIG. 1 is a block diagram of a particular illustrative embodiment of a system to provide communications services.

Referring to FIG. 1, a particular embodiment of a system to provide communications services is illustrated and designated generally at 100. The system 100 includes an ordering system 102 that is configured to communicate with user communications devices, such as the communications device(s) 118, via a private access network 120 of a cable television network or Internet Protocol Television (IPTV) network. The system 100 also includes a customer premise equipment (CPE) device, such as the residential gateway device 122, which is coupled to the communications device(s) 118 and which facilitates communication between the communications device(s) 118 and the private access network 120. The communication device(s) 118 can include one or more set-top box or other multimedia devices, one or more computing devices, one or more voice communication devices, or any combination thereof.

As illustrated in FIG. 1, the ordering system 102 can communicate with a promotion system 132 via an internal network 130. Various other systems can be communicatively coupled to the internal network 130. For example, a network capacity validator 126 can be communicatively coupled to the internal network 130. Further, a subscriber billing system 146 can be communicatively coupled to the internal network 130. In addition, a promotions and business rules data store 148 can be communicatively coupled to the internal network 130.

In a particular embodiment, the ordering system 102 can include a processor 104 and various modules 106-116 that are accessible to the processor 104. The modules 106-116 can include logic, hardware, computer instructions, or any combination thereof. In an illustrative embodiment, one or more of the various modules 106-116 can be computer instructions that are executable by the processor 104, where the instructions are stored as one or more computer programs by a memory device that is accessible to the processor 104. For example, the ordering system 102 can include a web portal module 106 that is executable by the processor 104 to operate an Internet portal to receive communications service orders, service inquiries, billing inquiries, reports of service problems, or any combination thereof, from user communications devices, such as computing devices or web-enabled portable communications devices.

In a particular embodiment, the ordering system 102 can include a voice portal module, such as an interactive voice response (IVR) portal module 108 that is executable by the processor 104 to receive communications service orders, service inquiries, billing inquiries, reports of service problems, or any combination thereof, from user voice communications devices, such as telephones, cellular phones and other portable communications devices, or Voice-over Internet Protocol (VoIP) phones.

In a particular embodiment, the ordering system 102 can include a set-top box portal module, such as a U-Verse portal module 110, that is executable by the processor 104 to receive communications service orders, service inquiries, billing inquiries, reports of service problems, or any combination thereof, from user multimedia communications devices, such as set-top box devices.

In a particular embodiment, the ordering system 102 can include one or more other portal modules 112. For example, the ordering system can include an agent portal module that is executable by the processor 104 to facilitate communication of communications service orders, service inquiries, billing inquiries, reports of service problems, or any combination thereof, between user communications devices, such as user voice communications devices, and agents, such as call center agents, online agents, or any combination thereof. In another example, the other portal modules 112 can include a captive portal module that is executable by the processor 104 to receive communications service orders, service inquiries, billing inquiries, reports of service problems, or any combination thereof, from communications devices of field technicians and other authorized parties, such as technicians that install CPE devices, set-top box devices, or any combination thereof.

In an illustrative embodiment, one or more of the modules 106-112 can be executable by the processor 104 to provide one or more portals to communicate with customers, technicians, and other parties at the ordering system 102. Alternatively, one or more of the modules 106-112 can be executable by the processor 104 to communicate with customers, technicians, and other parties via other devices external to the ordering system 102 that provide Internet portals, IVR portals, or other portals.

In a particular embodiment, the ordering system 102 can include one or more query modules 114 executable by the processor 104 to request data from other devices via the internal network 130. For example, the query module(s) 114 can be executable to request data related to communications services to be offered to a customer from the promotion system 132. In another example, the query module(s) 114 can be executable to request data related to a customer account from the subscriber billing system, such as data related to communications services previously ordered by or currently provided to the customer; data related to whether the customer is current on a billing account; data related to an authentication token required for changes to a customer account or to communications services provided to one or more communications devices of the customer; or any combination thereof.

In a particular embodiment, the ordering system 102 can include a billing and activation module 116 that is executable by the processor 104 to send data related to a customer's acceptance of one or more offers, or other orders, of one or more communications services to the promotion system 132, the billing and subscriber system 146, or any combination thereof. Further, the billing and activation module 116 can be executable by the processor 104 to send data related to a customer's acceptance of one or more offers, or other orders, of one or more communications services to the promotion system 132, another device or system, or any combination thereof, to cause the communications service(s) to be activated or otherwise provided to the communications device(s) 118.

In a particular embodiment, the promotion system 132 can include a processor 134 and various modules 136-144 accessible to the processor 134. The modules 136-144 can include logic, hardware, computer instructions, or any combination thereof. In an illustrative embodiment, one or more of the various modules 136-144 can be computer instructions that are executable by the processor 134, where the instructions are stored as one or more computer programs by a memory device that is accessible to the processor 134. For example, the promotion system 132 can include an ordering system communication module 136 that is executable by the processor 134 to communicate with the ordering system 102 to receive requests for, and to provide, data related to communications services to be offered to customers. Further, the ordering system communication module 136 can be executable by the processor 134 to receive data from the ordering system 102 related to whether a customer accepts or refuses one or more offered communications services.

In a particular embodiment, the promotion system 132 can include a bandwidth data retrieval module 138 executable by the processor 134 to request and receive data from a network capacity validator 126, or similar device, where the data is related to an attainable bandwidth value of a communications loop coupled to a customer's CPE device 122. Further, the bandwidth data retrieval module 138 can be executable by the processor 134 to request and receive data related to any bandwidth limitation of the private access network 120. In addition, the bandwidth data retrieval module 138 can be executable by the processor 134 to request and receive data related to a theoretical bandwidth value associated with the communications loop.

In an illustrative embodiment, a theoretical bandwidth value can correspond to a minimum, guaranteed, allotted, or other bandwidth available to customers receiving communications services via the private access network 120. For example, the bandwidth available to all new customers receiving communications services via the private access network 120 might be 20 megabytes per second (Mbps). Nonetheless, the attainable bandwidths of certain communications loops may be higher based on the lengths of the communications loops, traffic, other factors, or any combination thereof. For instance, if a customer is located within a certain distance of a serving area interface (SAI), a central office (CO), a particular switch, a network backbone, other elements of network infrastructure, or any combination thereof, the attainable bandwidth for a CPE device at that customer's premise may be greater than 20 Mbps. In a particular embodiment, the attainable bandwidth may be limited by a network bandwidth limitation of the private access network 120, such that the attainable bandwidth may be diminished in some cases.

In a particular embodiment, the promotion system 132 can include a billing system communication module 140 executable by the processor 134 to request and receive data from the billing and subscriber system 146 or other system communicating with the internal network 130, where the data is related to a customer account, such as data related to communications services previously ordered by or currently provided to the customer. Further, the billing system communication module 140 can be executable by the processor 134 to send data related to a customer's acceptance of one or more offered communications services or other orders of one or more communications services to the billing and subscriber system 146, such that the customer can be billed for such communications services.

In a particular embodiment, the promotion system 132 can include a service selection module 142 executable by the processor 134 to select one or more communications services to be offered to a customer, based at least partially on the attainable bandwidth value of the communications loop coupled to the customer's CPE device 122. Further, the service selection module 142 can be executable by the processor 134 to select the communications service(s), based at least partially on any bandwidth limitation of the private access network 120, one or more communications services previously ordered by the customer, one or more communications services previously provided to the customer, one or more communications services currently provided to the customer, one or more communications services currently being ordered by the customer, or any combination thereof.

In an illustrative, non-limiting embodiment, the service selection module 142 can be executable by the processor 134 to request and receive data from the promotions and business rules data store 148, where the data is related to current promotions packages (e.g., discounts for voice/data/video bundles, discounts for pre-ordering certain upcoming video content, discounts for ordering multiple different video programs at once, etc.) and other marketing strategies and rules stored at the promotions and business rules data store 148, for example, by marketing professionals or other parties of a service provider. Moreover, the service selection module 142 can be executable by the processor 134 to select the one or more communications services to be offered to the customer, based at least partially on data received from the promotions and business rules data store 148.

In an illustrative embodiment, the service selection module 142 can be executable by the processor 134 to compare a theoretical bandwidth value of a communications loop coupled to the CPE device 122 with an attainable bandwidth value of the communications loop, and to select one or more communications services to be offered to a customer when the attainable bandwidth value exceeds the theoretical bandwidth value. Further, the service selection module 142 can be executable by the processor 134 to select enhancements of one or more communications services currently provided to or ordered by the customer (e.g., offering a high-definition enhancement to a video-on-demand movie ordered by the customer), when the attainable bandwidth value does not exceed the theoretical bandwidth value. For example, when the attainable bandwidth value does not exceed the theoretical bandwidth value, the service selection module 142 can be executable by the processor 134 to request data from the network capacity validator 126 or QoS/Bandwidth Management System 124, related to bandwidth actually used at the CPE device 122, such as a current bandwidth used at the CPE device 122; data related to a maximum or average bandwidth used at the CPE device 122 during a time period; or any combination thereof. The service selection module 142 can be executable by the processor 134 to select one or more communications services, enhancements of current services, or any combination thereof, to be offered to the customer based at least partially on the bandwidth actually used at the CPE device 122 when the bandwidth actually used at the CPE device 122 is lower than the theoretical bandwidth associated with the communications loop coupled to the CPE 122.

In a particular embodiment, the promotion system 132 can include an offer data module 144 executable by the processor 134 to generate an offer of the selected communications services for communication to the ordering system 102. For example, the offer data module 144 can generate an offer that includes pricing, incentives, marketing language, customer-specific information, instructions to accept or refuse the offer, advantages of accepting the offer (including, but not limited to, advantages of additional communications services in terms of current services provided to the customer), other information useful to offer a service to a customer, or any combination thereof. In an illustrative embodiment, the ordering system communication module 136 can be executable by the processor 134 to communicate the offer to the ordering system 102.

In an illustrative embodiment, a customer can contact the ordering system 102 via a communications portal, such as a self-service Internet portal, that allows remote web access to customer account information. The customer can communicate with the communications portal, for example, using a computing device that is coupled to the customer's CPE device 122 or to another Internet access point. The customer can order one or more communications services to be provided at the communications device(s) 118, inquire about one or more communications services, inquire about an account, report a service disruption or other problem, make another communication, or any combination thereof.

In a particular embodiment, after the customer initiates communication with the ordering system 102, the ordering system 102 can request data from the promotion system 132 related to one or more communications services to be offered to the customer. In an illustrative embodiment, the ordering system 102 can prompt the customer for an authentication token or other customer identification information and can include customer identification data with the request to the promotion system 132. The promotion system 132 can request data related to an attainable bandwidth value of a communications loop coupled to the CPE device 122 from the network capacity validator 126. In an illustrative embodiment, the promotion system 132 can also request data related to a theoretical bandwidth value of the communications loop. Further, the promotion system 132 can request data related to any bandwidth limitation of the private access network 120 from the network capacity validator 126.

In an illustrative embodiment, the network capacity validator 126 can store one or more records 128 that include theoretical bandwidth values, attainable bandwidth values, network bandwidth limitations, values of maximum bandwidth actually used during a time period, values of average bandwidth actually used during a time period, values of current bandwidth actually used during a time period, or any combination thereof, associated with identifiers of various CPE devices, such as the CPE device 122. In an illustrative, non-limiting embodiment, identifiers can be IP addresses of such CPE devices. The values stored at the network capacity validator 126 can be received from the quality of service (QoS)/bandwidth management system 124 adapted to determine attainable bandwidths of one or more communications loops on a periodic basis; to determine the attainable bandwidth of a communications loop coupled to a CPE device when a customer associated with the CPE device contacts the ordering system 102; to determine actual bandwidth used at a CPE device on a periodic basis; to determine actual bandwidth used at a CPE device when a customer contacts the ordering system 102; or any combination thereof. The QoS/ bandwidth management system 124 can also be configured to determine any bandwidth limitation of the private access network 120 on a periodic basis, when a customer contacts the ordering system 102, or any combination thereof.

In an illustrative embodiment, the promotion system 132 can compare a value of an attainable bandwidth of the communications loop coupled to the CPE device 122 with a theoretical bandwidth value associated with the communications loop. If the attainable bandwidth value exceeds the theoretical bandwidth value, the promotion system 132 can select one or more communications services to be offered to the customer, where usage of the offered communications services and the communications services already provided to the customer will not exceed the attainable bandwidth of the communications loop coupled to the CPE device 122.

In an illustrative embodiment, if the promotion system 132 determines that the attainable bandwidth value does not exceed the theoretical bandwidth value, the promotion system can request from the network validator 126 data related to bandwidth actually used at the CPE device 122. The network validator 126 can instruct the QoS/bandwidth management system 124 to measure the bandwidth currently used at the CPE device 122 and can send data related to the bandwidth currently used to the promotion system 132. Alternatively, the network validator 126 can send data related to maximum or average bandwidth usage at the CPE device 122 to the promotion system 132. If bandwidth actually used at the CPE device 122 is lower than the theoretical bandwidth value (i.e., because the customer is only using video and data services via a communications loop whose theoretical bandwidth value is based on providing video, data, and voice services), the promotion system 132 can select one or more communications service enhancements to be offered to the customer, where usage of the offered communications service enhancement(s) and the communications services already provided to the customer will not exceed the theoretical bandwidth of the communications loop coupled to the CPE device 122.

In a particular embodiment, the promotion system 132 can select communications services to be offered to the customer from communication services stored at the promotion system 132, from promotional packages or offers stored at the promotions and business rules data store 148, or any combination thereof. The promotion system 132 can generate an offer related to the selected communications service(s) and can send data related to the offer to the ordering system 102 for communication to the customer computing device via the communications portal. In a particular embodiment, the offer can be communicated to the customer via other communications devices, such as e-mail, a portable wireless phone, or other communications devices.

In a particular embodiment, if the customer accepts the offer, the ordering system 102 can communicate data related to the acceptance of the offer to the promotion system 132. The ordering system 102, the promotion system 132, or any combination thereof, can send data related to the acceptance to the billing and subscriber system 146, such that the customer's account can be updated to reflect the accepted communications service(s) or communications service enhancement(s) and the customer can be billed accordingly. Further, the ordering system 102, the promotion system 132, or any combination thereof, can send data related to the acceptance to one or more devices to cause the accepted communications service(s) or communications service enhancement(s) to be activated or otherwise provided at the communications device(s) coupled to the CPE device 122. In addition, the ordering system 102, the promotion system 132, or any combination thereof, can send data related to the acceptance to the network capacity validator 126 or other device that stores data related to the bandwidth associated with communications services and communications service enhancement(s) provided to the customer.

In an illustrative embodiment, if a customer refuses an offer of additional communications services, the ordering system can send data related to the refusal to the promotion system 132. If the customer is ordering one or more services via the communications portal, the promotion system 132 can generate an offer related to enhancements of the ordered service(s) and can send data related to the offer to the ordering system 102 for communication to the customer.

Figure 2:
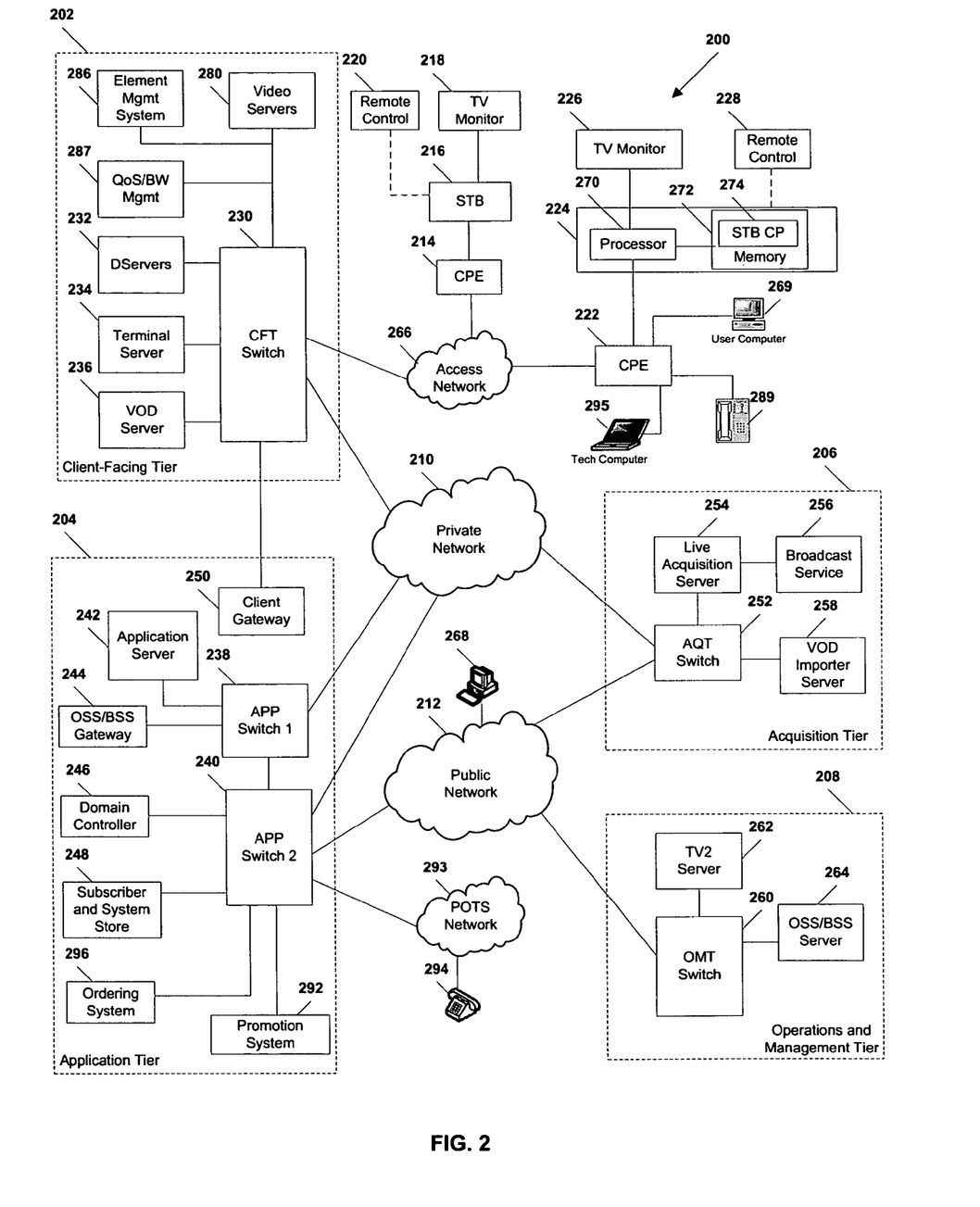
FIG. 2 is a block diagram of a second particular illustrative embodiment of a system to provide communications services.

Referring to FIG. 2, an illustrative embodiment of an Internet Protocol Television (IPTV) system that may be used to provide communications services is illustrated and is generally designated 200. As shown, the system 200 can include a client facing tier 202, an application tier 204, an acquisition tier 206, and an operations and management tier 208. Each tier 202, 204, 206, 208 is coupled to a private network 210; to a public network 212, such as the Internet; or to both the private network 210 and the public network 212. For example, the client-facing tier 202 can be coupled to the private network 210. Further, the application tier 204 can be coupled to the private network 210 and to the public network 212. The acquisition tier 206 can also be coupled to the private network 210 and to the public network 212. Additionally, the operations and management tier 208 can be coupled to the public network 212.

As illustrated in FIG. 2, the various tiers 202, 204, 206, 208 communicate with each other via the private network 210 and the public network 212. For instance, the client-facing tier 202 can communicate with the application tier 204 and the acquisition tier 206 via the private network 210. The application tier 204 can communicate with the acquisition tier 206 via the private network 210. Further, the application tier 204 can communicate with the acquisition tier 206 and the operations and management tier 208 via the public network 212. Moreover, the acquisition tier 206 can communicate with the operations and management tier 208 via the public network 212. In a particular embodiment, elements of the application tier 204, including, but not limited to, a client gateway 250, can communicate directly with the client-facing tier 202.

The client-facing tier 202 can communicate with user equipment via an access network 266, such as an Internet Protocol Television (IPTV) access network. In an illustrative embodiment, customer premises equipment (CPE) 214, 222 can be coupled to a local switch, router, or other device of the access network 266. The client-facing tier 202 can communicate with a first representative set-top box device 216 via the first CPE 214 and with a second representative set-top box device 224 via the second CPE 222. In a particular embodiment, the first representative set-top box device 216 and the first CPE 214 can be located at a first customer premise, and the second representative set-top box device 224 and the second CPE 222 can be located at a second customer premise. In another particular embodiment, the first representative set-top box device 216 and the second representative set-top box device 224 can be located at a single customer premise, both coupled to one of the CPE 214, 222.

In an illustrative embodiment, other communications devices can be coupled to the CPE 214, 222, such as a user computing device 269; a user phone, such as a Voice-over Internet Protocol (VoIP) phone 289; a field technician computing device 295, or any combination thereof.

The CPE 214, 222 can include routers, local area network devices, modems, such as digital subscriber line (DSL) modems, any other suitable devices for facilitating communication between communications devices and the access network 266, or any combination thereof. In an exemplary embodiment, the client-facing tier 202 can be coupled to the CPE 214, 222 via fiber optic cables. In another exemplary embodiment, the CPE 214, 222 can be digital subscriber line (DSL) modems that are coupled to one or more network nodes via twisted pairs, and the client-facing tier 202 can be coupled to the network nodes via fiber-optic cables. Each set-top box device 216, 224 can process data received via the access network 266, via an IPTV software platform, such as Microsoft® TV IPTV Edition.

The first set-top box device 216 can be coupled to a first external display device, such as a first television monitor 218, and the second set-top box device 224 can be coupled to a second external display device, such as a second television monitor 226. Moreover, the first set-top box device 216 can communicate with a first remote control 220, and the second set-top box device 224 can communicate with a second remote control 228. The set-top box devices 216, 224 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 216, 224 can receive data, video, or any combination thereof, from the client-facing tier 202 via the access network 266 and render or display the data, video, or any combination thereof, at the display device 218, 226 to which it is coupled. In an illustrative embodiment, the set-top box devices 216, 224 can include tuners that receive and decode television programming signals or packet streams for transmission to the display devices 218, 226. Further, the set-top box devices 216, 224 can include a STB processor 270 and a STB memory device 272 that is accessible to the STB processor 270. In one embodiment, a computer program, such as the STB computer program 274, can be embedded within the STB memory device 272.

In an illustrative embodiment, the client-facing tier 202 can include a client-facing tier (CFT) switch 230 that manages communication between the client-facing tier 202 and the access network 266 and between the client-facing tier 202 and the private network 210. As illustrated, the CFT switch 230 is coupled to one or more data servers, such as D-servers 232, that store, format, encode, replicate, or otherwise manipulate or prepare video content for communication from the client-facing tier 202 to the set-top box devices 216, 224. The CFT switch 230 can also be coupled to a terminal server 234 that provides terminal devices with a connection point to the private network 210. In a particular embodiment, the CFT switch 230 can be coupled to a video-on-demand (VOD) server 236 that stores or provides VOD content imported by the IPTV system 200. Further, the CFT switch 230 is coupled to one or more video servers 280 that receive video content and send the video content to the set-top boxes 216, 224 via the access network 266.

In a particular embodiment, the CFT switch 230 can be coupled to an element management system (EMS) 286 that stores attainable bandwidth values associated with various communications loops coupled to customer CPE devices. Further, the EMS 286 can store values of network bandwidth limitations related to, for example, the private access network 266, the private network 210, the public network 212, or any combination thereof. In addition, the EMS 286 can store theoretical bandwidth values associated with various communications loops coupled to customer CPE devices. In an illustrative embodiment, the EMS 286 can check attainable bandwidth, theoretical bandwidth, network bandwidth limitations, or any combination thereof, on a periodic basis, at the time that a customer places an order for a communications service, or any combination thereof. In a particular embodiment, the CFT switch 230 can be coupled to a quality of service and bandwidth management system (QBWM) 287 that queries the EMS 286 for bandwidth values and sends data related to the values to the promotion system 292 or ordering system 296.

In an illustrative embodiment, the client-facing tier 202 can communicate with a large number of set-top boxes via the access network 166, such as the representative set-top boxes 216, 224, over a wide geographic area, such as a metropolitan area, a viewing area, a statewide area, a regional area, a nationwide area or any other suitable geographic area, market area, or subscriber or customer group that can be supported by networking the client-facing tier 202 to numerous set-top box devices. In a particular embodiment, the CFT switch 230, or any portion thereof, can include a multicast router or switch that communicates with multiple set-top box devices via a multicast-enabled network.

As illustrated in FIG. 2, the application tier 204 can communicate with both the private network 210 and the public network 212. The application tier 204 can include a first application tier (APP) switch 238 and a second APP switch 240. In a particular embodiment, the first APP switch 238 can be coupled to the second APP switch 240. The first APP switch 238 can be coupled to an application server 242 and to an OSS/BSS gateway 244. In a particular embodiment, the application server 242 can provide applications to the set-top box devices 216, 224 via the access network 266, which enable the set-top box devices 216, 224 to provide functions, such as interactive program guides, video gaming, display, messaging, processing of VOD material and other IPTV content, etc. In a particular embodiment, the OSS/BSS gateway 244 includes operation systems and support (OSS) data, as well as billing systems and support (BSS) data. In one embodiment, the OSS/BSS gateway 244 can provide or restrict access to an OSS/BSS server 264 that stores operations and billing systems data.

The second APP switch 240 can be coupled to a domain controller 246 that provides Internet access, for example, to users at their computers via the public network 212. For example, the domain controller 246 can provide remote Internet access to IPTV account information, e-mail, personalized Internet services, or other online services via the public network 212. In addition, the second APP switch 240 can be coupled to a subscriber and system store 248 that includes account information, such as account information that is associated with users who access the IPTV system 200 via the private network 210 or the public network 212. In an illustrative embodiment, the subscriber and system store 248 can store subscriber or customer data and create subscriber or customer profiles that are associated with IP addresses, stock-keeping unit (SKU) numbers, other identifiers, or any combination thereof, of corresponding set-top box devices 216, 224.

In a particular embodiment, the second APP switch 240 can be coupled to a promotion server 292 that can select communications services to offer a customer based on attainable bandwidth, network bandwidth limitations, business rules and promotions, other factors, or any combination thereof. The second APP switch 240 can also be coupled to an ordering system 296 configured to respond to customer requests for communications services, repair service, billing inquiries, and the like. In an illustrative embodiment, the ordering system 296 can be accessed via one or more portals, such as a web portal, an interactive voice response portal, a call center, a set-top box device portal, or any combination thereof. In an illustrative, non-limiting embodiment, the second APP switch 240 can communicate with a user telephone, such as a plain old telephone service (POTS) device 294, via a public telephone network, such as a plain old telephone service (POTS) network 293. Further, the second APP switch 240 can communicate with a user computing device 268 via the public network 212.

In a particular embodiment, the application tier 204 can include a client gateway 250 that communicates data directly to the client-facing tier 202. In this embodiment, the client gateway 250 can be coupled directly to the CFT switch 230. The client gateway 250 can provide user access to the private network 210 and the tiers coupled thereto. In an illustrative embodiment, the set-top box devices 216, 224, or other devices coupled to the CPE 214, 222, can access the IPTV system 200 via the access network 266, using information received from the client gateway 250. User devices can access the client gateway 250 via the access network 266, and the client gateway 250 can allow such devices to access the private network 210 once the devices are authenticated or verified. Similarly, the client gateway 250 can prevent unauthorized devices, such as hacker computers or stolen set-top box devices from accessing the private network 210, by denying access to these devices beyond the access network 266.

For example, when the first representative set-top box device 216 accesses the client-facing tier 202 via the access network 266, the client gateway 250 can verify subscriber information by communicating with the subscriber and system store 248 via the private network 210. Further, the client gateway 250 can verify billing information and status by communicating with the OSS/BSS gateway 244 via the private network 210. In one embodiment, the OSS/BSS gateway 244 can transmit a query via the public network 212 to the OSS/BSS server 264. After the client gateway 250 confirms subscriber and/or billing information, the client gateway 250 can allow the set-top box device 216 to access IPTV content and VOD content at the client-facing tier 202. If the client gateway 250 cannot verify subscriber information for the set-top box device 216, e.g., because it is connected to an unauthorized twisted pair, the client gateway 250 can block transmissions to and from the set-top box device 216 beyond the access network 266.

As indicated in FIG. 2, the acquisition tier 206 includes an acquisition tier (AQT) switch 252 that communicates with the private network 210. The AQT switch 252 can also communicate with the operations and management tier 208 via the public network 212. In a particular embodiment, the AQT switch 252 can be coupled to a live acquisition server 254 that receives or acquires television content, movie content, advertisement content, other video content, or any combination thereof, from a broadcast service 256, such as a satellite acquisition system or satellite head-end office. In a particular embodiment, the live acquisition server 254 can transmit content to the AQT switch 252, and the AQT switch 252 can transmit the content to the CFT switch 230 via the private network 210.

In an illustrative embodiment, content can be transmitted to the D-servers 232, where it can be encoded, formatted, stored, replicated, or otherwise manipulated and prepared for communication from the video server(s) 280 to the set-top box devices 216, 224. The CFT switch 230 can receive content from the video server(s) 280 and communicate the content to the CPE 214, 222 via the access network 266. The set-top box devices 216, 224 can receive the content via the CPE 214, 222, and can transmit the content to the television monitors 218, 226. In an illustrative embodiment, video or audio portions of the content can be streamed to the set-top box devices 216, 224.

Further, the AQT switch 252 can be coupled to a video-on-demand importer server 258 that receives and stores television or movie content received at the acquisition tier 206 and communicates the stored content to the VOD server 236 at the client-facing tier 202 via the private network 210. Additionally, at the acquisition tier 206, the video-on-demand (VOD) importer server 258 can receive content from one or more VOD sources outside the IPTV system 200, such as movie studios and programmers of non-live content. The VOD importer server 258 can transmit the VOD content to the AQT switch 252, and the AQT switch 252, in turn, can communicate the material to the CFT switch 230 via the private network 210. The VOD content can be stored at one or more servers, such as the VOD server 236.

When users issue requests for VOD content via the set-top box devices 216, 224, the requests can be transmitted over the access network 266 to the VOD server 236, via the CFT switch 230. Upon receiving such requests, the VOD server 236 can retrieve the requested VOD content and transmit the content to the set-top box devices 216, 224 across the access network 266, via the CFT switch 230. The set-top box devices 216, 224 can transmit the VOD content to the television monitors 218, 226. In an illustrative embodiment, video or audio portions of VOD content can be streamed to the set-top box devices 216, 224.

FIG. 2 further illustrates that the operations and management tier 208 can include an operations and management tier (OMT) switch 260 that conducts communication between the operations and management tier 208 and the public network 212. In the embodiment illustrated by FIG. 2, the OMT switch 260 is coupled to a TV2 server 262. Additionally, the OMT switch 260 can be coupled to an OSS/BSS server 264 and to a simple network management protocol (SNMP) monitor 286 that monitors network devices within or coupled to the IPTV system 200. In a particular embodiment, the OMT switch 260 can communicate with the AQT switch 252 via the public network 212.

In an illustrative embodiment, the live acquisition server 254 can transmit content to the AQT switch 252, and the AQT switch 252, in turn, can transmit the content to the OMT switch 260 via the public network 212. In this embodiment, the OMT switch 260 can transmit the content to the TV2 server 262 for display to users accessing the user interface at the TV2 server 262. For example, a user can access the TV2 server 262 using a personal computer 268 coupled to the public network 212.

In a particular illustrative embodiment, a CPE device, such as the second CPE 222, can be installed at a customer premise. In an illustrative embodiment, the second CPE 222 can include any digital subscriber line (xDSL) router, a residential gateway (RG), an intelligent network interface device (iNID), or any combination thereof. A customer can receive one or more first communications services, such as voice communications services, video communications services, data communications services (e.g., high-speed Internet services), or any combination thereof, via one or more communications devices coupled to the second CPE 222, such as the user computing device 269, the user phone 289, the second representative set-top box device 224, or any combination thereof. In an illustrative embodiment, the first communications service(s) can be provided based on a theoretical bandwidth of a communications loop coupled to the second CPE 222. For example, the theoretical bandwidth may be a theoretical maximum, average, or guaranteed lowest bandwidth of the communications loop.

After installation of the CPE 222, the system 200 can select one or more additional communications services to be offered to the customer. The additional communications services can be selected based at least partially on the first communications service(s); an attainable bandwidth of a communications loop coupled to the second CPE 222; a network bandwidth limitation; a theoretical bandwidth of the communications loop; bandwidth actually used at the CPE 222; one or more business rules for determining promotion packages and other offers; or any combination thereof.

In a particular embodiment, an attainable bandwidth of a communications loop coupled to the second CPE 222 can be determined. For example, a field technician can use a client application operating at the technician computing device 295 to communicate with the EMS 286 via the access network 266. The field technician can receive the attainable bandwidth of the communications loop by issuing a command to the QBWM 287 to retrieve from the EMS 286 the attainable bandwidth value associated with the communications loop coupled to the second CPE 222. In another embodiment, the field technician can issue a command to the QBWM 287 to instruct the EMS 286 to test the attainable bandwidth of the communications loop. The QBMW 287 can send data related to the attainable bandwidth value to the technician computing device 295 via the access network 266. In addition, the technician computing device 295 can receive data related to a network bandwidth limitation, if any, associated with the access network 266. Further, the technician computing device 295 can receive data related to a theoretical bandwidth of the communications loop. Alternatively, the theoretical bandwidth value can be stored at the technician computing device 295.

In an illustrative embodiment, the field technician, the client application operating at the technician computing device 295, or any combination thereof, can determine whether the attainable bandwidth value exceeds a theoretical bandwidth value associated with the communications loop. For example, the theoretical bandwidth value may be a value of 20 megabytes per second (Mbps), whereas the attainable bandwidth value may be 30 Mbps due to the length of the communications loop and other factors. If the attainable bandwidth is higher than the theoretical bandwidth, and no upstream network bandwidth limitation is present that would prevent the communications loop from realizing the attainable bandwidth, then the field technician, the client application operating at the technician computing device 295, or any combination thereof, can offer additional communications services to the customer. Alternatively, the technician computing device 295, client application operating at the technician computing device 295, or any combination thereof, can instruct a customer service agent or system to offer such additional communications services to the customer via the user computing device 269, the user phone 289, the user computing device 268, the user POTS phone 294, another communication device, or any combination thereof.

In an illustrative embodiment, the technician computing device 295 can receive data related to one or more additional communications services from the ordering system 296 via the client gateway 250, the OSS/BSS gateway 244, or another captive portal that authenticates the technician computing device 295. In another embodiment, the technician computing device 295 can receive data related to one or more additional communications services from the promotion system 292. The additional communications service(s) can be selected by the ordering system 296, the promotion system 292. Further, the technician computing device 295 can receive data related to an offer related to the additional communications service(s) that the field technician can present to the customer.

If the customer accepts an offer for additional communications service(s), the field technician can use the technician computing device 295 to send data related to the acceptance to the ordering system 296, the promotion system 292, the subscriber and system store 248, another server of the IPTV system 200, or any combination thereof, such that the additional communications service(s) can be activated and billed to the customer's account. In an illustrative, non-limiting embodiment, if the customer refuses the additional communications service(s), the customer's name or other identification information can be added to a promotions list, and the same or other additional communications service(s) can be offered to the customer at a later time via e-mail or postal mail, for example.

Figure 3:
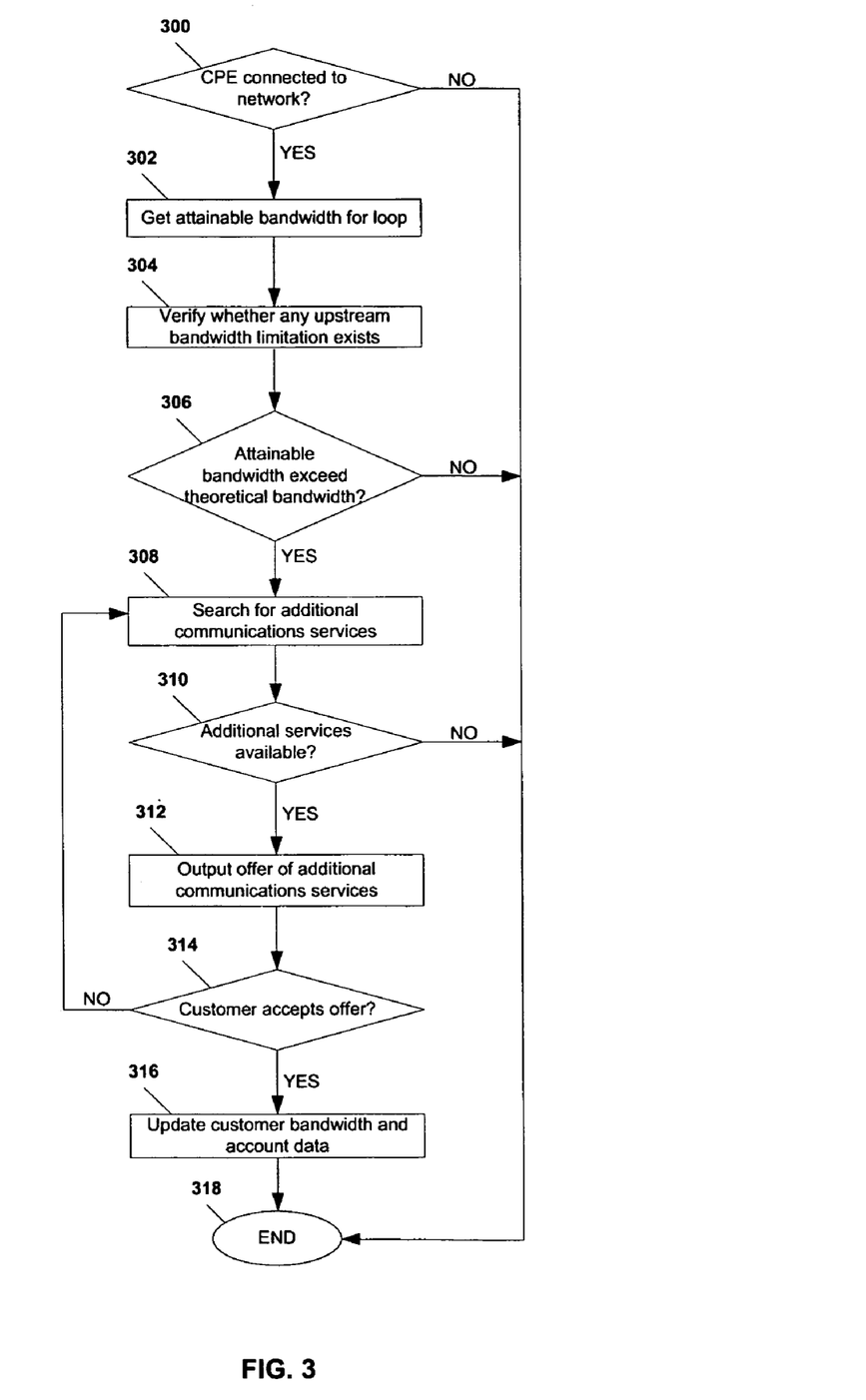
FIG. 3 is a flow diagram of a particular illustrative embodiment of a method of providing communications services.

Referring to FIG. 3, a particular illustrative embodiment of a method of providing communications services is illustrated. At decision node 300, a communications device can determine whether a customer premise equipment (CPE) device at a customer premise is connected to an access network. For example, a client application running at a field technician computing device can prompt the technician or other user to indicate whether the CPE device is installed. If no CPE device has been connected to the network, the method terminates at 318. Conversely, if a CPE device has been connected to the network, the method continues to block 302.

Moving to block 302, the communications device can request and receive an attainable bandwidth of a communications loop coupled to the CPE device via the access network. For example, the communications device can request and receive data related to the attainable bandwidth value from an ordering system, a promotion system, a network capacity validator, an element management system, a bandwidth management system, or any combination thereof, via the access network. Moving to block 304, in a particular embodiment, the communications device can request and receive verification of any upstream bandwidth limitation, such as a bandwidth limitation of the access network communicating with the CPE device via the communications loop.

Proceeding to decision node 306, a technician or other user of the communications device, the communications device, a client application operating at the communications device, or any combination thereof, can determine whether the attainable bandwidth value exceeds a theoretical bandwidth value associated with the communications loop. The theoretical bandwidth value can be requested from one or more upstream devices or systems via the access network, can be stored at the communications device, or any combination thereof. In a particular embodiment, if the attainable bandwidth is not higher than the theoretical bandwidth, the method can terminate at 318.

On the other hand, if the attainable bandwidth is higher than the theoretical bandwidth, the method advances to block 308, and the communications device can search for selected additional communications services to be offered to the customer based at least partially on the attainable bandwidth. For example, the communications device can issue a request for data related to additional communications services to an upstream device or system automatically upon determining that the attainable bandwidth exceeds the theoretical bandwidth, or in response to a command to retrieve data related to additional communications services. In another embodiment, the communications device can search information related to communications services stored at the communications device. In a particular embodiment, the additional communications services to be offered to the customer can also be selected based at least partially on any network bandwidth limitation.

At decision node 310, the communications device can determine whether any additional communication services are available to offer to the customer. For example, the communications device can determine whether it has received data related to such additional communications services or an offer of such additional communications services, or whether it has received data indicating that the additional communications services that are available have been refused by the customer or would exceed the attainable bandwidth. Alternatively, the communications device can determine that it cannot find information stored locally that relates to additional communications services that have not been refused by the customer or would not exceed the attainable bandwidth.

If the communications device determines that no additional communications services are available, the method terminates at 318. Whereas, if the communications device determines that additional communications services are available, the method moves to block 312, and the communications device outputs an offer related to selected additional communications services. For example, a printed offer can be output by the communications device. In another example, the offer can be displayed at the communications device.

Proceeding to decision node 314, it is determined whether the customer accepts the offer. If the customer refuses the offer, the method returns to block 308 and continues as described, the communications device searching for other communications services to offer to the customer. Conversely, if the customer accepts the offer, the method advances to block 316, and the communications device can update customer account data and bandwidth usage at one or more devices or systems via the access network. The method terminates at 318.

Figure 4:
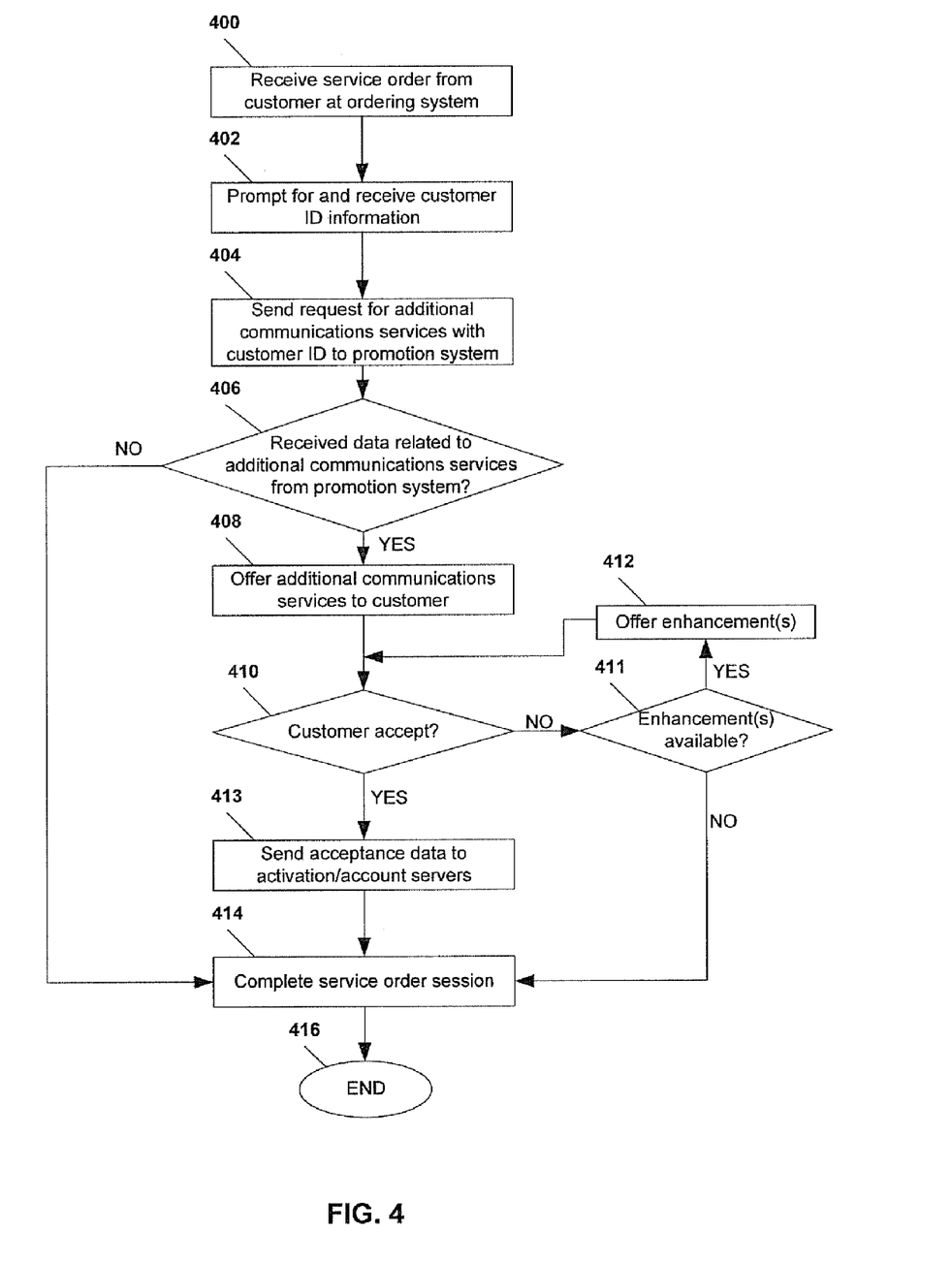
FIG. 4 is a flow diagram of a second particular illustrative embodiment of a method of providing communications services.

Referring to FIG. 4, a second particular illustrative embodiment of a method of providing communications services is illustrated. At block 400, a communications services ordering system can receive a service order from a customer via a communications portal, such as a self-service Internet portal that allows remote web access to customer account information; a voice portal, such as an interactive voice response system or call center; a video portal, such as a portal that allows customers to communicate with the ordering system via a set-top box device; or another portal. The customer can communicate with the communications portal to order one or more communications services to be provided via one or more communications devices coupled to a customer premise equipment (CPE) device; to inquire about one or more communications services; to inquire about a billing account or other account; to report a service disruption or other problem; to make another communication; or any combination thereof.

Moving to block 402, in a particular embodiment, the ordering system can prompt the customer for an authentication token or other customer identification information. Continuing to block 404, the ordering system can send a request to a promotion system via an internal network, for example, that can include customer identification data. Proceeding to decision node 406, the ordering system can determine whether it has received data related to one or more additional communications services to be offered to the customer. The additional communications service(s) can be selected based at least partially on an attainable bandwidth of a communications loop coupled to the customer's CPE.

If the ordering system does not receive data related to such additional communications service(s), the method can advance to block 414. On the other hand, if the ordering system determines that it has received data related to such additional communications service(s), the method moves to block 408, and the ordering system can present an offer of the additional communications service(s) to the customer. The offer can be received at the ordering system from the promotion system. Alternatively, the ordering system can generate the offer based on the data related to the additional communications service(s).

Moving to decision node 410, the ordering system determines whether the customer accepts the offer. In a particular embodiment, if a customer refuses the offer of additional communications services, and the customer is ordering one or more services, the method can move to decision node 411, and the ordering system can determine whether any enhancement(s) of the ordered services, not already refused by the customer, are available. For instance, if a customer is ordering a particular movie or sporting event, the ordering system can determine whether a high-definition version of the program is available. If the ordering system determines that such enhancement(s) are not available, the method proceeds to block 414. Whereas, if the ordering system determines that such enhancement(s) are available, the method moves to block 412, and the ordering system can present an offer related to enhancement(s) of the ordered service(s). The method then returns to decision node 410.

Returning to decision node 410, if the customer accepts the offer, the method proceeds to block 413, and the ordering system can communicate data related to the acceptance of the offer to the promotion system, a billing and subscriber system, one or more devices that cause the additional communications service(s) or communications service enhancement(s) to be activated or otherwise provided to the communications device(s) coupled to the CPE device, or any combination thereof. The method then continues to block 414. Proceeding to block 414, the service order session with the customer can be completed. The method terminates at 416.

Figure 5:
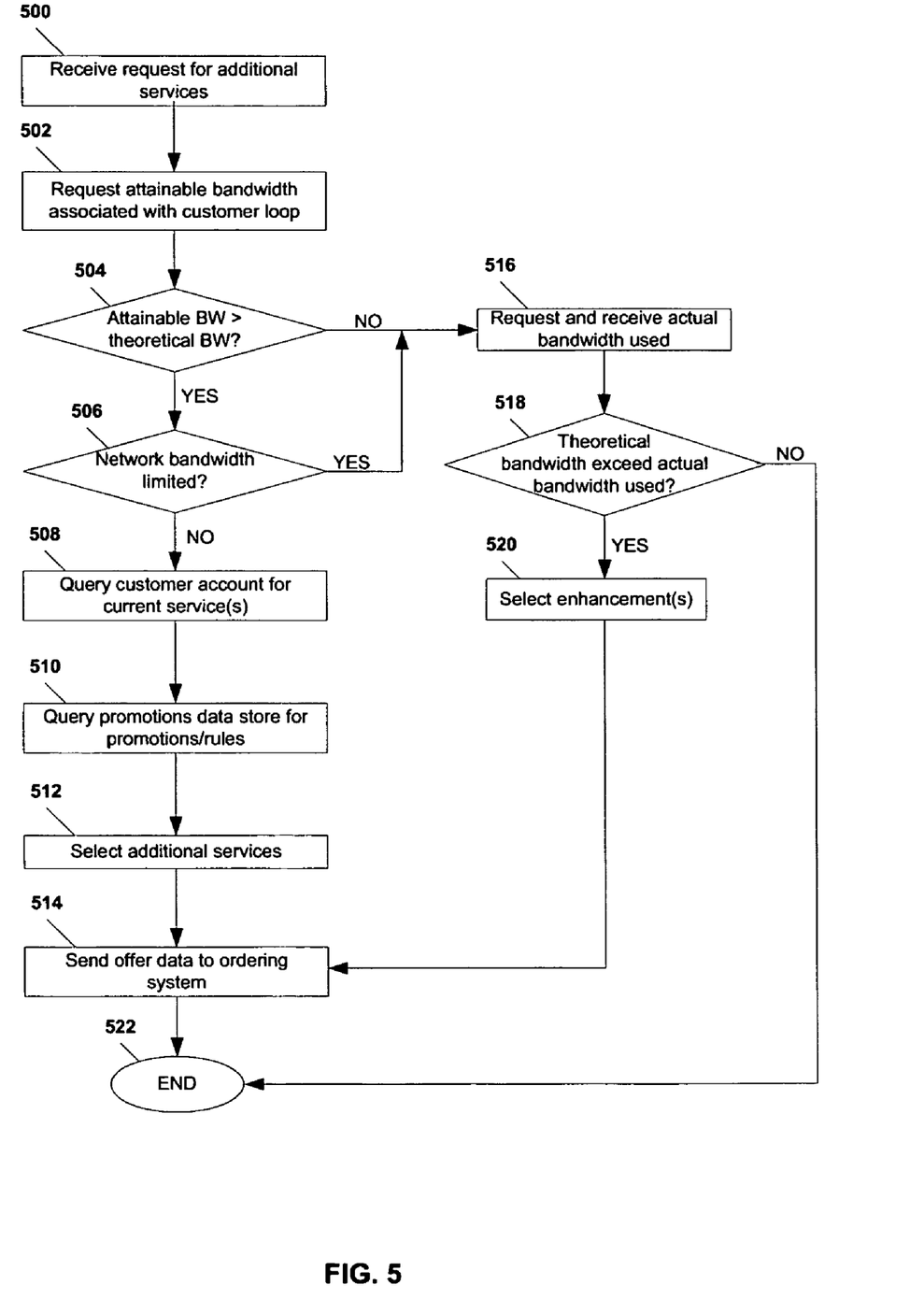
FIG. 5 is a flow diagram of a third particular illustrative embodiment of a method of providing communications services.

Referring to FIG. 5, a third particular illustrative embodiment of a method of providing communications services is illustrated. At block 500, a communications services promotion system receives a request for additional communications services to be offered to a customer from an ordering system. Moving to block 502, the promotion system requests and receives an attainable bandwidth value related to a communications loop coupled to a customer premise equipment (CPE) device of the customer from a network capacity validator, element management system, quality of service system, bandwidth management system, one or more other devices that store bandwidth data, or any combination thereof. In an illustrative embodiment, the promotion system can receive identification data related to the customer, the CPE device, the communications loop, or any combination thereof, from the ordering system with the request for additional communications services. Bandwidth data can be associated with such identification data at the device(s) from which the promotion system requests the attainable bandwidth value.

Continuing to decision node 504, the promotion system determines whether the attainable bandwidth value exceeds a theoretical bandwidth value of the communications loop coupled to the customer's CPE device. In an illustrative embodiment, the promotion system can request and receive data related to the theoretical bandwidth value from the device(s) from which data related to the attainable bandwidth value is received. In another embodiment, the promotion system can request and receive data related to the theoretical bandwidth value from another device, such as a device that stores customer account information, customer profiles, or other customer information. In a further embodiment, the promotion system can store the theoretical bandwidth value, for example, where the theoretical bandwidth value is a minimum, average, guaranteed, allotted, or other bandwidth value associated with all customers or a group of customers. For example, the theoretical bandwidth value can be a bandwidth value allotted to all new subscribers when an account is opened.

In a particular embodiment, if the promotion system determines that the attainable bandwidth value exceeds the theoretical bandwidth value, the method advances to decision node 506, and the promotion system can determine whether any bandwidth limitation is associated with a network that communicates with the customer's CPE device via the communications loop. For example, the promotion system can request and receive data related to such bandwidth limitation from the device(s) from which data related to the attainable bandwidth value is received, from another device, such as a device that monitors network operation, or any combination thereof.

In an illustrative embodiment, if the promotion system determines that there is a network bandwidth limitation that diminishes the attainable bandwidth, the method can move to block 516. Conversely, in a particular embodiment, if the promotion system determines that there is not a network bandwidth limitation, the method can continue to block 508, and the promotion system can query a customer account for one or more communications services currently, previously, or both currently and previously provided to the customer. Proceeding to block 510, in an illustrative, non-limiting embodiment, the promotion system can query a promotions data store to determine current promotional offers, rules for determining communications services to offer to a customer, or any combination thereof.

Advancing to block 512, the promotion system selects one or more additional communications services to be offered to the customer. The additional communications service(s) can be selected based at least partially on the attainable bandwidth value, the theoretical bandwidth value, the degree or absence of network bandwidth limitation, communications services previously provided to the customer, communications services currently provided to the customer, current promotional offers, business rules to select communications services to be offered to customers, or any combination thereof. The method then proceeds to block 514.

In an illustrative, non-limiting example, the promotion system can determine that the attainable bandwidth of the communications loop coupled to the customer's CPE is 48 Mbps, whereas the theoretical bandwidth value of the communications loop is 20 Mbps. The promotion system can determine that the customer is currently receiving video and high-speed Internet services. The promotion system can receive data from a promotions data store indicating that digital phone and high-definition services are being promoted together and can offer these additional communications services to the customer, so long as they do not require more than 48 additional Mbps of bandwidth. In this example, however, the promotion system can determine that the customer has previously canceled or refused digital phone service, and the promotion system can determine not to select digital phone service as one of the additional communications services to be offered to the customer.

Returning to decision node 504, if the promotion system determines that the attainable bandwidth value does not exceed the theoretical bandwidth value, the method moves to block 516, and the promotion system can request and receive a value of bandwidth actually used at the customer's CPE device, such as a current bandwidth used at the CPE device, a maximum bandwidth used at the CPE device during a time period, an average bandwidth used at the CPE device during a time period, or other measure of bandwidth actually used at the CPE device. For example, the promotion system can instruct a bandwidth management system, element management system, or other device to test current bandwidth used at the CPE device. In another example, the device(s) that store the attainable bandwidth value, the theoretical bandwidth value, the network bandwidth limitation, or any combination thereof, can store data related to bandwidth actually used at the CPE device.

Continuing to decision node 518, the promotion system can determine whether the theoretical bandwidth exceeds the bandwidth actually used at the CPE device. If the theoretical bandwidth does not exceed the bandwidth actually used at the CPE, the method terminates at 522. Whereas, if the theoretical bandwidth exceeds the bandwidth actually used at the CPE device, the method moves to block 520, and the promotion system can select enhancements of services provided to the customer. The method can then proceed to block 514.

In an illustrative, non-limiting example, a customer can order a particular video program via the ordering system. The promotion system can determine that the attainable bandwidth of the communications loop coupled to the customer's CPE device does not exceed the theoretical bandwidth of 20 Mbps, but that the customer is only using 10 Mbps of bandwidth at the time of the order. The promotion system can select an enhancement of the ordered program, for example, that may require only an additional 8 Mbps of bandwidth.

At block 514, the promotions system can send data related to an offer of the selected additional communications services to the ordering system for communication to the customer. The method terminates at 522.

In a particular embodiment, the steps of the methods described herein can be executed in the order shown by the figures. In alternative embodiments, some steps can be executed simultaneously or in alternative sequences.

In conjunction with the configuration of structure described herein, the system and method disclosed provide one or more communications services to be offered to a customer based at least partially on an attainable bandwidth of a communications loop coupled to the customer's customer premise equipment (CPE) device. In a particular illustrative embodiment, a customer, technician, or other party can contact an ordering system via a communications portal. In a particular embodiment, the ordering system can request data from a promotion system related to one or more communications services to be offered to a customer. The promotion system can request data related to an attainable bandwidth value of a communications loop coupled to the customer's CPE device from a device that stores bandwidth data. In an illustrative embodiment, the promotion system can also request data related to a theoretical bandwidth value of the communications loop. Further, the promotion system can request data related to any bandwidth limitation of a network communicating with the CPE device.

In an illustrative embodiment, the promotion system can compare the attainable bandwidth value with a theoretical bandwidth value associated with the communications loop. When the attainable bandwidth value exceeds the theoretical bandwidth value, the promotion system can select one or more additional communications services to be offered to the customer. The promotion system can generate an offer related to the selected communications service(s) and can send data related to the offer to the ordering system for communication to the customer or other party via the communications portal.

Figure 6:
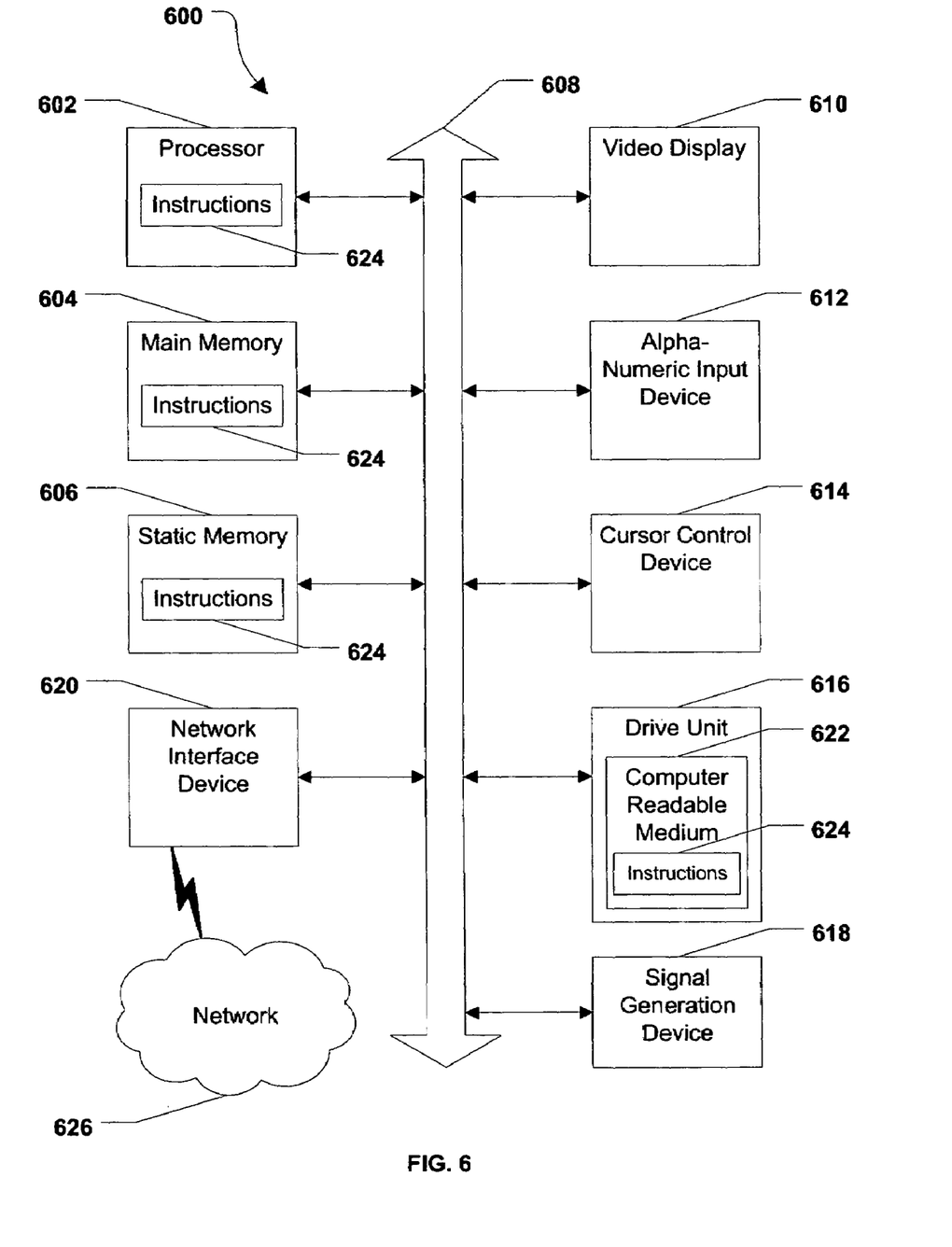
FIG. 6 is a diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices, including a server or other system, a set-top box device or other communications device, or any combination thereof, as shown in FIGS. 1-2.

In a networked deployment, the computer system may operate in the capacity of an IPTV server, such as an ordering system or promotion system, or a set-top box device, customer premise equipment (CPE) device or other communications device. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving first data, the first data associated with an attainable bandwidth value of a communications loop, the communications loop coupled to a customer premises equipment device, wherein the attainable bandwidth value indicates a first amount of bandwidth that the communications loop is capable of providing to the customer premises equipment device, wherein a first communications service is provided to the customer premises equipment device via the communications loop;
   receiving second data, the second data associated with a theoretical bandwidth value of the communications loop, wherein the theoretical bandwidth value indicates a second amount of bandwidth that is allotted to the customer premises equipment device by a communications service provider;
   determining whether the attainable bandwidth value is greater than the theoretical bandwidth value;
   in response to determining that the attainable bandwidth value is greater than the theoretical bandwidth value, selecting an additional communications service to be offered; and
   in response to determining that the attainable bandwidth value is not greater than the theoretical bandwidth value, receiving third data associated with a measured amount of bandwidth that is used by the customer premises equipment device, wherein a service enhancement to be offered is selected based at least in part on the measured amount of bandwidth of the customer premises equipment device.

2. The method of claim 1, further comprising, in response to determining that the attainable bandwidth value is greater than the theoretical bandwidth value, receiving fourth data associated with an extent of a bandwidth limitation of a private access network, the private access network providing the first communications service to the customer premises equipment device, wherein the additional communications service to be offered is selected based at least in part on the extent of the bandwidth limitation.

3. The method of claim 1, further comprising receiving promotions data from a promotions data store, the promotions data associated with a promotional offer, wherein the additional communications service is selected based at least in part on the promotions data.

4. The method of claim 1, wherein the additional communications service is selected based at least in part on the first communications service.

5. The method of claim 1, further comprising sending offer data associated with an offer of the additional communications service to the customer premises equipment device in response to selecting the additional communications service to be offered.

6. The method of claim 1, further comprising receiving a request for the additional communications service from the customer premises equipment device.

7. The method of claim 1, wherein the additional communications service is selected based at least in part on a previously ordered communications service.

8. The method of claim 2, further comprising receiving fifth data associated with a previously canceled communications service, wherein the additional communications service selected to be offered excludes the previously canceled communications service.

9. The method of 8, further comprising receiving sixth data associated with a previously refused offer for a second communications service, wherein the additional communications service selected to be offered excludes the second communications service based on the previously refused offer.

10. The method of claim 1, wherein the service enhancement to be offered is an enhancement of the first communications service.

11. The method of claim 10, wherein the measured amount of bandwidth is associated with an average bandwidth that is used by the customer premises equipment device during a particular time period.

12. The method of claim 1, wherein the communications loop is intermediate to the customer premises equipment device and a serving area interface of a private access network.

13. The method of claim 1, wherein the attainable bandwidth value of the communications loop is based on a length of the communications loop.

14. The method of claim 10, wherein the service enhancement to be offered is selected conditioned on the measured amount of bandwidth that is used by the customer premises equipment device being less than the theoretical bandwidth value.

15. The method of claim 14, wherein the service enhancement includes a high-definition stream of a television program.

16. The method of claim 1, wherein the additional communications service includes voice services, video services, or data services.

17. A method comprising:
receiving an order at an ordering system for a first communications service to be provided to a user;
receiving offer data associated with an additional communications service to be offered to the user from a promotion system;
receiving first data associated with an attainable bandwidth value of a communications loop coupled to a customer premises equipment device, wherein the attainable bandwidth value indicates a first amount of bandwidth that the communications loop is capable of providing to the customer premises equipment device;
receiving second data associated with a theoretical bandwidth value of the communications loop coupled to the customer premises equipment device, wherein the theoretical bandwidth value indicates a second amount of bandwidth that is allotted to the customer premises equipment device by a communications service provider;
determining whether the attainable bandwidth value is greater than the theoretical bandwidth value;
in response to determining that the attainable bandwidth value is greater than the theoretical bandwidth value, selecting the additional communications service to be offered to the user; and
in response to determining that the attainable bandwidth value is not greater than the theoretical bandwidth value, receiving third data associated with a measured amount of bandwidth that is used by the customer premises equipment device, wherein a service enhancement to be offered is selected based at least in part on the measured amount of bandwidth of the customer premises equipment device.

18. The method of claim 17, further comprising sending a request to the promotion system for the additional communications service to be offered to the user.

19. The method of claim 17, wherein the order is received via a communications portal.

20. The method of claim 19, wherein the communications portal is an internet portal.

21. The method of claim 19, wherein the communications portal is an interactive voice response system.

22. The method of claim 19, wherein the communications portal is a set-top box device communication portal.

23. The method of claim 19, further comprising offering the additional communications service via the communications portal.

24. The method of claim 17, further comprising:
sending an offer for the additional communications service to the user in response to selecting the additional communications service to be offered;
receiving an acceptance of the offer for the additional communications service at the ordering system, the acceptance initiated from the user;
activating the additional communications service accepted by the user; and
sending acceptance data indicating the acceptance to a billing system in response to receiving the acceptance.

25. A system comprising:
a processor; and
a memory device accessible to the processor, wherein the memory device includes instructions to:
determine whether an attainable bandwidth value is greater than a theoretical bandwidth value, wherein the attainable bandwidth value indicates a first amount of bandwidth that a communications loop is capable of providing to a customer premises equipment device and wherein the theoretical bandwidth value indicates a second amount of bandwidth that is allotted to the customer premises equipment device by a communications service provider;
in response to determining that the attainable bandwidth value is greater than the theoretical bandwidth value, select an additional communications service to be offered; and
in response to determining that the attainable bandwidth value is not greater than the theoretical bandwidth value, receive a measured bandwidth value associated with a third amount of bandwidth that is used by the customer premises equipment device, wherein a service enhancement to be offered is selected based at least in part on the measured amount of bandwidth of the customer premises equipment device.

26. The system of claim 25, wherein the memory device further includes instructions to send acceptance data associated with an indication that a user has accepted the additional communications service to a bandwidth management system.

27. The system of claim 25, wherein the attainable bandwidth value is retrieved from a bandwidth management system and wherein the bandwidth management system updates the attainable bandwidth value on a periodic basis.

28. A non-transitory computer-readable medium storing processor-executable instructions that, when executed by a processor, cause the processor to:

- determine whether an attainable bandwidth value is greater than a theoretical bandwidth value, wherein the attainable bandwidth value indicates a first amount of bandwidth that a communications loop coupled to a customer premises equipment device is capable of providing to the customer premises equipment device and wherein the theoretical bandwidth value indicates a second amount of bandwidth that is allotted to the customer premises equipment device by a communications service provider, wherein a first communications service is provided to the customer premises equipment device via the communications loop;
- in response to determining that the attainable bandwidth value is greater than the theoretical bandwidth value, offer an additional communications service; and
- in response to determining that the attainable bandwidth value is not greater than the theoretical bandwidth value, receive a measured bandwidth value associated with a third amount of bandwidth that is used by the customer premises equipment device, wherein a service enhancement to be offered is selected based at least in part on the measured amount of bandwidth of the customer premises equipment device.

29. The non-transitory computer-readable medium of claim 28, wherein the processor-executable instructions are included in a client application stored at a communications service field technician computing device.

30. The non-transitory computer-readable medium of claim 29, further comprising processor-executable instructions that, when executed by the processor, cause the processor to determine whether the customer premises equipment device has been installed at a particular premises.

* * * * *